United States Patent
Wentz

(10) Patent No.: US 11,575,517 B2
(45) Date of Patent: Feb. 7, 2023

(54) METHODS AND SYSTEMS FOR UTILIZING HARDWARE-SECURED RECEPTACLE DEVICES

(71) Applicant: Ares Technologies, Inc., Boston, MA (US)

(72) Inventor: Christian T Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 100 days.

(21) Appl. No.: 16/861,767

(22) Filed: Apr. 29, 2020

(65) Prior Publication Data

US 2020/0351098 A1   Nov. 5, 2020

Related U.S. Application Data

(60) Provisional application No. 62/841,949, filed on May 2, 2019.

(51) Int. Cl.
*H04L 9/32* (2006.01)
*H04L 9/30* (2006.01)

(52) U.S. Cl.
CPC ............ *H04L 9/3234* (2013.01); *H04L 9/30* (2013.01); *H04L 9/3231* (2013.01); *H04L 9/3247* (2013.01); *H04L 9/3297* (2013.01)

(58) Field of Classification Search
CPC ....... H04L 9/3234; H04L 9/30; H04L 9/3231; H04L 9/3247; H04L 9/3297
See application file for complete search history.

(56) References Cited

U.S. PATENT DOCUMENTS

| | | | |
|---|---|---|---|
| 8,150,767 B2 | 8/2012 | Wankmueller | |
| 8,924,301 B2* | 12/2014 | Lindelsee | G06Q 20/40 705/44 |
| 9,355,391 B2* | 5/2016 | von Behren | G06Q 20/047 |
| 2014/0108786 A1* | 4/2014 | Kreft | G06F 21/335 713/194 |
| 2015/0120472 A1* | 4/2015 | Aabye | G06Q 20/36 705/16 |
| 2015/0142666 A1* | 5/2015 | Landrok | G06Q 20/4016 705/67 |
| 2015/0254642 A1 | 9/2015 | Bondesen et al. | |
| 2016/0065378 A1* | 3/2016 | Kim | H04L 9/3278 713/184 |

(Continued)

OTHER PUBLICATIONS

PCT/US21/29555/; International Search Report; dated Aug. 3, 2021; by: Authorized Officer: Kari Rodriquez.

*Primary Examiner* — Jung W Kim
*Assistant Examiner* — Alan Lingqian Kong
(74) *Attorney, Agent, or Firm* — Caldwell Intellectual Property Law

(57) ABSTRACT

A system for using hardware-secured receptacle devices includes a transfer processing device configured to store transfer method data associated with user on at least a cryptographically secured receptacle device, receive user authentication credentials from a user, authenticate user identity as a function of the user authentication credentials, retrieve a transfer authorization from the at least a cryptographically secured receptacle device as a function of the transfer method data, generate a transfer as a function of the transfer authorization.

18 Claims, 7 Drawing Sheets

(56) References Cited

U.S. PATENT DOCUMENTS

2016/0134599 A1* 5/2016 Ross .................. H04L 63/0815
                                                    713/168
2017/0200155 A1  7/2017 Fourez et al.
2019/0334884 A1  10/2019 Ross et al.

* cited by examiner

METHODS AND SYSTEMS FOR UTILIZING HARDWARE-SECURED RECEPTACLE DEVICES

CROSS-REFERENCE TO RELATED APPLICATIONS

This application claims the benefit of priority of U.S. Provisional Patent Application Ser. No. 62/841,949, filed on May 2, 2019, and titled "METHODS AND SYSTEMS FOR PERFORMING ELECTRONIC TRANSACTIONS USING DIGITAL WALLETS AND TRUSTED COMPUTING," which is incorporated by reference herein in its entirety.

FIELD OF THE INVENTION

The present invention generally relates to the field of data storage and authentication in distributed computing systems. In particular, the present invention is directed to methods and systems for using hardware-secured receptacle devices.

BACKGROUND

Digital processes transferring rights typically require many data storage and transmission steps. Secure storage of authentication information for processes has become an increasingly important problem, often effected through storage of a collection of private keys or similar authentication data used to establish a user's right to perform a process at issue. Unfortunately, secure storage of authentication information has been plagued with challenges.

SUMMARY OF THE DISCLOSURE

In an aspect, a method of using hardware-secured receptacle devices includes storing, by a transfer processing device, transfer method data associated with user on at least a cryptographically secured receptacle device, receiving, by the transfer processing device, user authentication credentials from a user, authenticating, by the transfer processing device, user identity as a function of the user authentication credentials, retrieving, by the transfer processing device, a transfer authorization from the at least a cryptographically secured receptacle device as a function of the transfer method data, and generating, by the transfer processing device, a transfer as a function of the transfer authorization.

In another aspect, a system for using hardware-secured receptacle devices includes a transfer processing device configured to store transfer method data associated with user on at least a cryptographically secured receptacle device, receive user authentication credentials from a user, authenticate user identity as a function of the user authentication credentials, retrieve a transfer authorization from the at least a cryptographically secured receptacle device as a function of the transfer method data, generate a transfer as a function of the transfer authorization.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
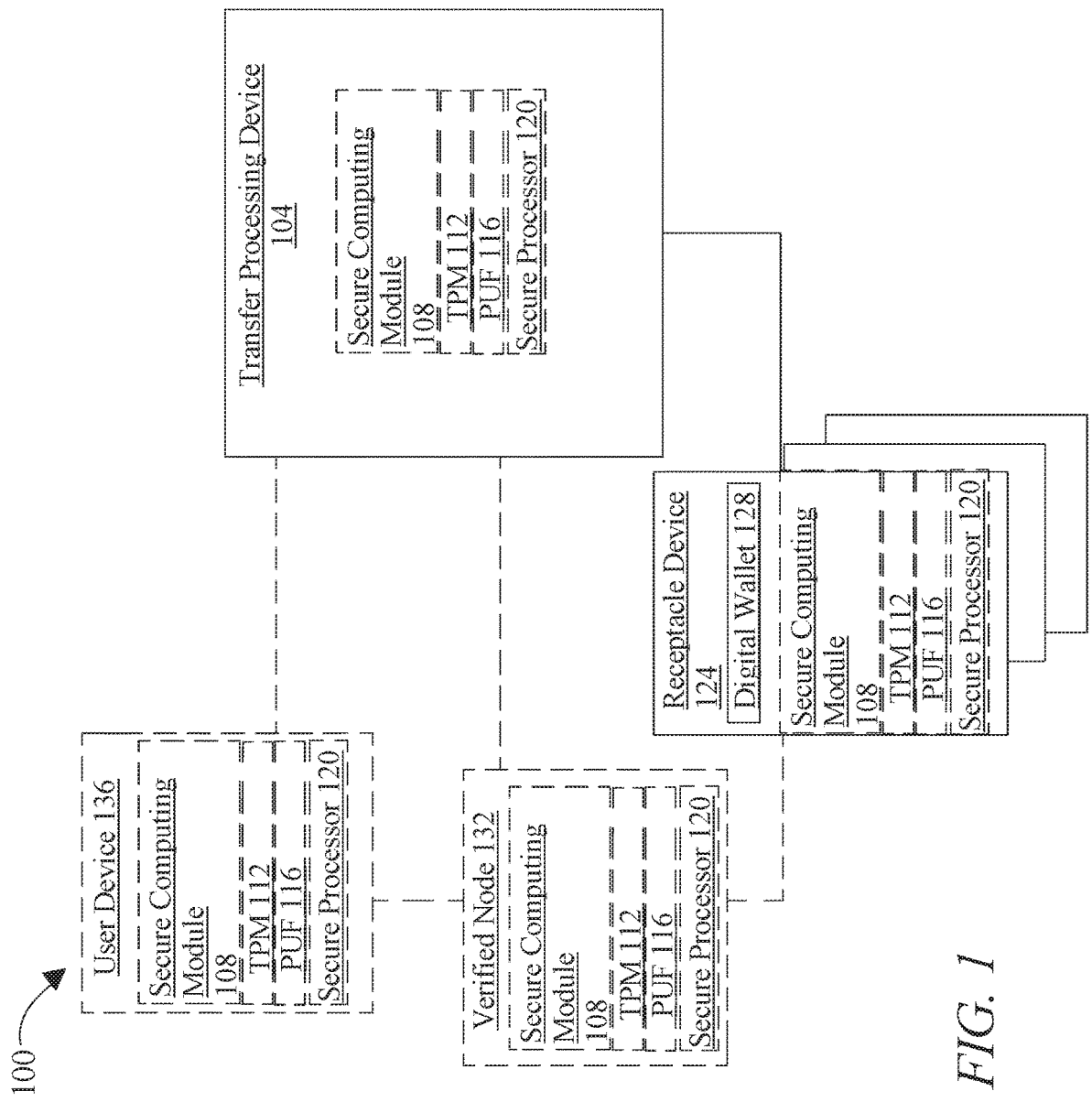
FIG. 1 is a block diagram illustrating an exemplary embodiment of a system for hardware-secured receptacle devices.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to efficient methods of performing electronic processes using hardware-secured receptacle devices. Online processes and in-person processes are complex and often take time and effort on behalf of user to provide and input information. Furthermore, such processes are susceptible to theft and hacking. Embodiments of presently disclosed methods and systems provide for convenient and secure storage of information usable to perform processes, by combining aspects of trusted computing and/or distributed storage. Storage nodes may be authenticated and selected according to trustworthiness, with potential weak points in storage protocols being performed by highly trusted nodes. Rigor in node and user authentication may be varied according to trust levels and user preferences to achieve an ideal balance of convenience and security. In embodiments, storage may be performed with authorization data linked directly to hardware of particular devices, such as particular nodes or user devices.

Systems and methods as described herein may involve computation, calculation, assessment, assignment, or use of a confidence level associated with one or more processes, devices, or data, including without limitation one or more processes, appraisals, and/or distributed storage nodes as described herein. A confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Confidence level may be quantified as a dollar value that represents the cost an adversary would expend (in time and money) to compromise a device including a such as a transfer processing device, user device, and/or receptacle device, as disclosed in further detail below. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

One or more instances of a device with associated confidence level may be located remotely from one or more other devices as disclosed in further detail herein; as a non-limiting example, a receptacle device for storing cryptographic keys associated with cryptocurrency and/or virtual currency as described in further detail below, storing digital representations of fiat currencies, securities, or other instruments of value, or storing cryptographic keys, passwords or other authenticating data that may be used to access such digital or physical instruments of value located elsewhere may be located remotely from user devices and/or transfer processing devices as disclosed in further detail below. Remote instance may be connected to the Internet in such a way that digital assets, or digital representations of physical assets, are readily available for trade on asset exchanges, for "staking" in proof of stake systems, for establishing proof of authority (e.g. proof of identity or association suggesting credibility), and/or any other allocation of real or inferred value. Remote instance may be accessible over the Internet by one or more authenticator devices, using a variety of mechanisms depending on requirements, as described further below.

Referring now to FIG. 1, an exemplary embodiment of a system 100 for electronic transactions using digital wallets and trusted computing is illustrated. System 100 includes transfer processing device 104, that may act to authenticate and evaluate information of a user or first party seeking to perform an electronic transaction utilizing a digital wallet. User may be a human being, corporation, sole proprietorship, partnership, limited liability corporation, merchant, and any combination thereof. User may engage a second party or receiving party to whom an electronic transaction is performed with. Second party may be a human being, corporation, sole proprietorship, partnership, limited liability corporation, merchant, and any combination thereof. In an embodiment, second party may be a device such as a computer, tablet, laptop, smart-phone, tablet, mobile device, and/or kiosk to which information and/or assets may be transferred. Transfer processing device 104, acting as an intermediate cryptographic evaluator may be a computer, laptop, smart-phone, tablet, mobile device, and/or kiosk. In an embodiment, transfer processing device 104 may be a computing device or set of computing devices. Transfer processing device 104 may be any device that may act to authenticate a transaction utilizing a digital wallet. This may include transactions between businesses, consumer-to-consumer payments, consumer to business payments, consumer to merchant payments, and merchant to merchant payments. In an embodiment, transfer processing device 104 may be a user device, such as a user computer, a user laptop, a user smart-phone, a user tablet, a user mobile device, and/or a user kiosk. In an embodiment user transfer processing device 104 may be solely owned and/or operated by user. In an embodiment, transfer processing device 104 be owned and/or operated by a third party, distinct and separate from user. In an embodiment, transfer processing device 104 may be owned and/or operated by second party.

With continued reference to FIG. 1, transfer processing device 104 may further comprise a server. A server may include a computer program or a device that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital wallet through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, transfer processing device 104 may include a processor with security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Transfer processing device 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of transfer processing device 104 to another device, authenticating the validity of secure software loaded onto the device, or other data, including without limitation inputs, outputs, time of loading, and/or time of execution of software, boot sessions, or the like.

With continued reference to FIG. 1, transfer processing device 104, and/or other devices in system 100 as disclosed herein, may function as, include, and/or communicate with an authenticator device or prover of knowledge. An authenticator device is may convey with strong cryptographic guarantees that a possessor of the authenticator device is able to access a remote device, such as without limitation a receptacle device, described in detail below. An authenticator device may include a hardware module or package, and may include and/or be incorporated into a large number of physical device formats, including in nonlimiting examples a keyfob, a USB dongle, NFC or related device analogous to two-factor authentication keys, credit card, mobile phone, smart watch, RFID tag, or similar, injectable/implantable device, automobile, clothing, jewelry, eyewear, contact lens, hearing aid, around the ear or in ear communication device (e.g. analogous to Apple AirPods) and the like. A total size of an authenticator device may make integration into nearly any form factor feasible. In an injectable form factor, authenticator device may additionally include a means of wireless communication to an external reader/repeater device to connect to remote secure processors. These communications methods may include near-field RF, far-field RF, ultra-wide band and other methods of coupling between two devices via electromagnetic fields, infrared optical links, capacitive, inductive, or galvanic coupling, and the like. Injectable/implanted device form factor may be powered externally by the reader device (e.g. passive RFID or any wireless powering implementations based upon the electromagnetic or optical methods described above for communication), may contain a power source, or may generate its own power from in nonlimiting examples chemical (e.g. glucose fuel cell or related), thermal, mechanical, or electromagnetic scavenging energy harvesting. Communications and powering methods described above may be mapped to any other device integration target described above.

With continued reference to FIG. 1, an authenticator device as described above may be further improved by incorporating means of providing a software and/or hardware signature of authenticity of data conferring unique personally authenticating credentials. This information may be utilized in an attestation chain using remote or anonymous attestation as described in further detail herein. Effectively, this incorporation of personally authenticating credentials with the physical device attestation described elsewhere may allow a full chain of attestation from a person or persons and their assets in a fully anonymous, cryptographically strong fashion. In non-limiting example, the data conferring unique personally authenticating credentials may be data from one or more biometric sensors, e.g. fingerprint, retina, iris, and the like, solely or in combination.

With continued reference to FIG. 1, an authenticator device may utilize solely or in combination with any other biometric data described herein one or more unique signatures based upon audible or silent speech, as a non-limiting example, of a given passphrase, signatures based on measurable cardiovascular and/or autonomic nervous system parameters such as heart rate variability, galvanic skin response, pulse oximetry, and the like. Measurement of these parameters may be conducted via any means known to those skilled in the art, including in non-limiting examples optical measurement of the face and/or eye (to detect pulsatile changes to the pupil diameter or other parameter), for instance in the case of a device incorporated into eyewear, AR/VR system, contact lens or the like. The device may further integrate methods to infer whether the person or persons providing personally authenticating credentials is under duress, such as whether they are being forced against their will to enable access to a remote device or data. In non-limiting examples, inference of duress may utilize one or more data sources, e.g. speech data, galvanic skin response, measurements of the autonomic nervous system (e.g. pupils, pupil response, heart rate, heart rate variability, blood pressure and the like). In the event that multiple persons are required to authenticate access, physical proximity of the persons may be confirmed using capacitive, inductive, galvanic or other couplings between the two devices, e.g. upon the persons making physical contact.

With continued reference to FIG. 1, in an embodiment there may exist one or more authenticator stage devices, such as one or more transfer processing devices. Such devices may present information such as a secret, which may be composed of one or more keys or key shards, via interactive or non-interactive proof of knowledge including without limitation zero knowledge proof as described in further detail below or other mechanism establishing permission to access one or more devices, such as receptacle devices, as described below, either for intermediate evaluation or for storage of payment methods, including without limitation remote key storage. In an embodiment, an authentication stage may be performed using a single prover of knowledge. In an embodiment, the authenticator stage may include participation of multiple provers of knowledge, such as without limitation a key holder committee. Requirements for proof of knowledge may require one, a threshold number, or all provers of knowledge to present information to access a subsequent level of key store access, either intermediate evaluator or end remote key store. Multiple provers at any level may be implemented, as a non-limiting example via key sharding using Shamir's secret sharing algorithm or other key sharding mechanism, or similar processes. In an embodiment, sharding may involve splitting a private key into several pieces or shards, so that each individual shard alone cannot be used to reconstruct the private key or perform other authentication and/or cryptographic actions, but when enough shards are present it is possible to reconstruct the private key. For example, without limitation and as an illustration, a private key may be split into five shards, but only three may be needed to reconstruct the private key. In an embodiment, transfer processing device 104, and/or receptacle device 124, acting as authenticating devices, may require one, a threshold number, or all of the shards to reconstruct the private key. In an embodiment, shards of a private key may be stored remotely and/or in separate locations so that compromise of an individual remote instance of a shard is insufficient to gain access, since all or a threshold number of shards would be necessary to reconstruct the private key. In an embodiment, geographical location of shards and/or redundant distribution of copies of keys may be preferential to unlock and/or authenticate on geographically close exchanges. For example, digital assets such as cryptocurrencies and other securities may prefer to locate a key store containing the cryptocurrency as close to a particular exchange as possible. In an embodiment, multiple copies of keys may be located near a variety of exchanges and each key is then able to unlock whichever one is closest to the highest performing or otherwise most appealing exchange. In an embodiment, transfer processing device 104 and/or receptacle device 124 may require a master key to authenticate. For example, a bank may require a master key to authenticate transactions that are valuable, so that failure to authenticate results in revocation of a transaction. Alternatively, threshold signatures may be implemented using BLS signatures, ring signatures, or the like. In a tiered access setup, it may be desirable to obfuscate the location of a remote data storage device; in non-limiting example, obfuscation of location of the remote key store may be achieved by use of a distributed lookup protocol, such as without limitation Chord, in which key/data mappings are stored in trusted setups. In an embodiment, sharding may be used with other secret data in place of a private key.

With continued reference to FIG. 1, in an embodiment, an authenticator stage may consist of one "client" prover of knowledge and one more "custodian" provers of knowledge, for instance, in the event access controls are needed, for regulatory compliance in the case of financial institutions providing custody, or any other configuration of more than one prover of knowledge. In an example where a threshold number or the totality of provers of knowledge are required to access a device or resource stored thereon, presentation of knowledge may be required to occur within a specified window of time. In a non-limiting example, a set of provers of knowledge required to access the next level of key store and/or digital wallet access may be selected at random. Such a mechanism may provide additional robustness against targeted attack of provers of knowledge, for instance if a randomly selected specific n of k provers of knowledge is required to access the next stage, rather than any n of k, then the burden for targeted attack becomes greater than n of k. When k is large, this may become infeasible. Random selection may be accomplished using any number of mechanisms, including verifiable delay functions (VDFs) in the case where a secure processor is not available, or using a secure processor or other trusted setup and proof of elapsed time (PoET), or other mechanism known to those skilled in the art. Trusted setup may be a computational architecture that provides protections against software attacks in the case of a "software trusteed setup", such as without limitation the Sanctum processor from MIT, or "hardware trusted setup" that provides additional protections against physical tampering or espionage, for instance via power, thermal, or other output patterns. Random selection may be implemented by utilizing a simple bit comparison scheme, for instance and without limitation where each prover of knowledge may be equipped with a high entropy source, such as a random number generator (RNG) operating within a trusted setup, and selection amounts to this random source matching some logical operation primitives, whether fixed or variable. In such cases random selection may require "at least n of k" provers.

Still referring to FIG. 1, in an embodiment, it may be advantageous to have multiple copies of the data storage devices or data contained therein, for instance to ensure physical proximity to a financial exchange or other interface, to establish geographic redundancy, or the like. In such cases, a distributed lookup protocol such as without limitation a Chord protocol may be used to map to the nearest, highest performance or otherwise optimally located data storage device.

With continued reference to FIG. 1, transfer processing device 104 may include a secure computing module 108. As used herein, a secure computing module 108 is a hardware element configured to perform one or more secured operations beyond the control of other circuit elements or software, whether incorporated with the secure computing module 108 in a circuit or computing device, or a part of an extrinsic computing device. As a result, at least one secured operation performed by secure computing module 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 108 and/or a system or computing device incorporating secure computing module 108 based on the above-described set of assumptions. As a non-limiting example, a secure computing module 108 designed to produce an expected result despite all software-only attacks may give rise to a first confidence level, whereas another secure computing module 108 designed to produce its expected result in the face of all software or hardware attacks may give rise to a second confidence level; the second confidence level may be higher, owing to the reduced probability that the second secure computing module 108 would be compromised.

Still viewing FIG. 1, secure computing module 108 may include a trusted platform module 112 (TPM). In an embodiment, TPM 112 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 112 may have any suitable elements of digital or analog circuitry usable to perform one or more processes as described herein, including without limitation processes used to determine confidence levels and/or authenticate digitally signed assertions as described below. TPM 112 may have memory and/or other logic and/or a processor in its own right which may be in a non-limiting example a crypto-processor. TPM 112 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 108 may include at least PUF 116. PUF 116 may be implemented by various means. In an embodiment, PUF 116 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photo-diodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 116 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 116 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 116 in an embodiment include without limitation buskeeper PUFs, which may be similar to other PUFs based on bistable memory elements but leveraging buskeeper cells. PUF 116 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 116 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1, PUF 116 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

Continuing to refer to FIG. 1, PUF 116 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 116 that may be used may include, without limitation, nano-electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from PUF 116 and/or TPM 112; such outputs may be used to generate symmetric or asymmetric keys, private keys, zero-knowledge proofs, or other proofs of authenticity, as described in further detail below.

Continuing to refer to FIG. 1, secure computing module 108 may implement one or more secure memory storage protocols. One or more secure memory storage protocols may be protocols designed to prevent unauthorized access to memory and/or to protect secure computing module 108 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 108. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 108 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 108 may use hardware-enabled access control to protect memory access; hardware access control may, as a non-limiting example, be performed by tagging each memory entry with a "container identifier" corresponding to a page, file, or other grouping of memory, enabling secure computing module 108 to determine whether tampering has occurred.

Secure computing module 108 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 108 may operate using one or more dedicated memory objects, registers, or storage elements; as a non-limiting example, secure computing module 108 may operate with dedicated cache lines not available to other processes or circuits, preventing, e.g., stack or buffer overrun attacks to corrupt or steal data. Dedicated memory elements may be wired only to secure computing module 108; access to dedicated memory elements may be rendered impossible except by way of secure computing module 108. Secure computing module 108 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 108 may utilize oblivious random access memory (RAM) wherein memory access patterns are obfuscate to prevent detection of memory access patterns by outside observers attempting to deduce execution details regarding processes performed using secure computing module 108 Secure computing module 108 and/or device incorporating secure computing module 108 may incorporate a trusted non-volatile storage device that provides some means of verification of secure storage capability and other properties. Memory protocols as described above may be used to implement methods of attested storage and the chain of trust beginning at PUF 116 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 108.

Still referring to FIG. 1, secure computing module 108 may include a secure processor 120. Secure processor 120 may be a processor as described below in reference to FIG. 6. Secure processor 120 may operate autonomously from other processors and/or an operating system operating on at least a distributed storage node; for instance, secure processor may store entries in temporary or long-term memory in encrypted form, where decryption is impossible without private keys not available to devices, circuits or software besides secure processor. Encryption may likewise be impossible without private keys available only to secure processor 120. Secure processor 120 may also digitally sign memory entries using, for instance, a private key available only to secure processor 120. Keys available only to secure processor 120 may include keys directly encoded in hardware of the secure processor 120; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 120. Secure processor 120 may be constructed, similarly to TPM 112, to frustrate alteration and/or probing to discover and/or alter private keys. Private keys may be demonstrable as uniquely associated with secure processor 120 by use of PUF 116 as described above; secure processor 120 may include, for instance, a TPM 112 as described above. Alternatively or additionally, a certificate authority as described above, which may be a manufacturer of secure processor, may verify that one or more public keys are associated uniquely with secure processor according to any protocol suitable for digital certificates.

Further referring to FIG. 1, any computing device described in this disclosure may be configured to generate digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and with continued reference to FIG. 1, zero-knowledge proof may include a non-interactive zero-knowledge, proof, or a proof wherein neither party to the proof interacts with the other party to the proof for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1, zero-knowledge proof may include any other suitable zero-knowledge proof. Zero-knowledge proof may include, without limitation bullet-proofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, and with continued reference to FIG. 1, secure proof may be implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, a digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, and continuing to refer to FIG. 1, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Nonprovisional application Ser. No. 16/682, 809, filed on Nov. 13, 2019, and entitled "METHODS AND SYSTEMS FOR IMPLEMENTING AN ANONYMIZED ATTESTATION CHAIN," the entirety of which is incorporated herein by reference.

In some embodiments, and with further reference to FIG. 1, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

Still referring to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, and still referring to FIG. 1, persons, devices, or transfers may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, with continued reference to FIG. 1, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 108 as described in further detail below; in such scenarios, authentication may include proof by the secure computing module 108 that the secure computing module 108 possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Continuing to refer to FIG. 1, certificate authority may be implemented in a number of ways, including without limitation as described in U.S. Nonprovisional application Ser. No. 16/680,787, filed on Nov. 12, 2019, and entitled "METHODS AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Non-provisional application Ser. No. 16/680, 787.

Still referring to FIG. 1, digital signatures may be generated using a secure computing module 108. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a remote device and/or secure computing module 108 may convert immediate output from PUF 116 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a remote device and/or secure computing module 108 may extract one or more random numbers based on a PUF 116 output to create a symmetric key as described above. Alternatively or additionally, extraction may include extraction of a private key of a public key cryptographic system.

Still referring to FIG. 1, key extraction may include use of a number output by a PUF 116 or other circuit to generate a public and private key pair. For instance, such a number output may be used as a seed in an elliptic curve cryptographic system. In a nonlimiting example, output may include a random number generated within a desired interval, which may be achieved, for instance, by setting the number of output bits to be provided from a PUF 116; steps along a chosen elliptic curve may then be performed using random number to generate a public key. Initial point on elliptic curve and elliptic curve may be selected using an additional random numbers, which may be generated using any suitable method; random numbers associated with curves having known vulnerabilities may be discarded, according to mathematical descriptors or other characteristics of such vulnerabilities as stored in memory of or accessible to at least a remote device and/or secure computing module 108. Persons skilled in the art, upon reading the entirety of this disclosure, will be aware of various ways in which a random number may be used to generate a private and public key pair consistently with this disclosure.

Still viewing FIG. 1, Key extraction may utilize a numerical output from a PUF 116 or other element of secure computing module 108 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 116 and/or elements of secure computing module 108 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 1, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 108 may act as a "first signer" of a digital signature, signing with a private key produced from a secret generator as described above. In an embodiment secure computing module 108 signs an element of data using the private key. A second signer, which may be secure computing module 108 and/or an additional element coupled thereto, may previously or subsequently sign the element of data or another element linked to the element previously signed; alternatively or additionally, second signer may use information or signature elements provided by secure computing module 108 to perform a digital signature. This process may, for instance, enable generation of novel secret keys using additional circuitry, to demonstrate, for instance, timeliness of execution and frustrate delay-based attacks. DAA may perform digital signature using a zero-knowledge proof for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

With continued reference to FIG. 1, secure computing module 108 may implement one or more methods of attested computation. Attested computation may include or involve one or more methods to ensure that computation of a program, known as an attested program, is trusted and signed by secure computing module 108 and/or computing device incorporating secure computing module 108; this may be supported by means to assert the state of the system memory, code, input data and/or output data. In an embodiment, attested computing may include or involve one or more methods to authenticate a boot loader. An authenticated boot loader may include a first code that the secure computing module 108 may run upon system initialization and is responsible for checking the measurements and/or signatures of subsequent components either locally or by utilizing a piece of trusted hardware such as a TPM 112. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric or asymmetric key pair key based upon the trusted software component's hash. In an embodiment the measured root may utilize at least a processor key derivation secret to derive a symmetric or asymmetric key pair for decrypting a trusted software component and may include subsequent evaluation of the trusted software component. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, secure computing module 108 and/or a computing device incorporating secure computing module 108 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 108 and/or computing device incorporating secure computing module 108 may append a cryptographic signature based upon any private key that may be associated with secure computing module 108 as described herein. Secure computing module 108 and/or computing device incorporating secure computing module 108 may operate a security reset of working memory prior to load of data for trusted computation; for instance, the secure computing module 108 and/or computing device incorporating secure computing module 108 may append a hash of the memory to cryptographic hash of system state following reset and prior to loading data. Secure computing module 108 and/or computing device incorporating secure computing module 108 may append its authentication signature of memory page tables and/or memory tables. Upon completion of the trusted computation, which may include execution of program code of system state, secure computing module 108 and/or computing device incorporating secure computing module 108 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 108. Secure computing module 108 and/or computing device incorporating secure computing module 108 may include a system to compute one or more hash trees of cryptographic hash of the computation, system state, and/or outputs; secure computing module 108 and/or computing device incorporating secure computing module 108 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of secure computing modules 108 may include, without limitation, a TPM 112 as described above. Secure computing module 108 may include a TPM 112 combined with a boot-measuring protocol using hash trees, Merkle trees, or the like to measure boot entries to create an "attested boot." Secure computing module 108 may include a trusted execution technology (TXT) module combining TPM 112 with establishment of a secure container at run-time; secure container may be isolated from a software stack and OS of at least a temporal attester 104 and/or use TPM 112 to measure and attest to secure container prior to launch. Secure computing module 108 may include execute-only memory (XOM). Secure computing module 108 may include an Aegis processor. Secure computing module 108 may include a Bastion processor. Secure computing module 108 may include a trusted execution environment (TEE) or enclave, such as that enabled by SOFTWARE GUARD EXTENSIONS (SGX) system as promulgated by Intel Corporation of Santa Clara, Calif. Secure computing module 108 may include a Sanctum processor based on RISC V architecture. Secure computing module 108 may include an Ascend secure infrastructure. Secure computing module 108 may include a Ghostrider secure infrastructure. Secure computing module 108 may include an ARM TrustZone. Secure computing module 108 may include a Trusted Little Kernel (TLK) as promulgated by Nvidia Corporation of Santa Clara, Calif. Secure computing module 108 may include Secure Encrypted Virtualization (SEV) as promulgated by Advanced Micro Devices, Inc. of Santa Clara, Calif. Persons skilled in the art, upon reviewing the entirety of this disclosure, will be aware of various additional or alternative trusted computing processes that may be used to implement secure computing module 108 as disclosed herein. System 100 may incorporate or communicate with a certificate authority.

Transfer processing device 104 may be configured to perform any method and/or method steps disclosed herein, in any combination and with any degree of repetition. As a non-limiting example, transfer processing device 104 may be configured to store transfer method data associated with a user in a digital wallet implemented on at least a receptacle device, receive user authentication credentials, authenticate user identity as a function of the user authentication credentials, retrieve a payment authorization from the digital wallet as a function of the transfer method data, and generate a payment as a function of the payment authorization. As another non-limiting example, transfer processing device 104 may be configured to select a verification datum linked to at least a receptacle device, associate the verification datum with the user, retrieve a payment method authorization from the receptacle device, and generate a payment as a function of the payment method authorization. As another non-limiting example, transfer processing device 104 may be configured to calculating a confidence level in at least a receptacle device, select the at least a receptacle device as a function of the confidence level, and store a payment method associated with a user account in the at least a receptacle device.

With continued reference to FIG. 1, system 100 includes a at least a receptacle device 124, which may be a device such as a computer, laptop, smart-phone, tablet, mobile device, and/or kiosk that may store remotely transfer method data and/or sensitive user information. In an embodiment, at least a receptacle device 124 may store a plurality of transfer method data, each pertaining to an explicit user. Where at least a receptacle device 124 stores a plurality of transfer method data, at least a receptacle device 124 may generate an output consisting of a private key that reveals the entirety of one of the plurality of transfer method data but not all of the plurality of transfer method data. Private key may be intrinsic to at least a receptacle device 124. In an embodiment, at least a receptacle device 124 may be transfer processing device 104, or at least a receptacle device 124 may include a user device. In an embodiment, at least a receptacle device 124 may include its own separate independent device. In yet another embodiment, at least a receptacle device 124 may comprise at least a data storage node. At least a receptacle device 124 may include a verified node as described in further detail below.

Still referring to FIG. 1, system 100 includes a digital wallet 128, which may be any hardware or software implementing storage of transfer method data, on at least a receptacle device 124. Digital wallet 128 may include a distributed storage structure, such as a distributed hash table any data storage facility including without limitation a database, and/or hardware containing a secret usable to create a secure proof that generates payment authorization, such as a hardcoded digital signature circuit, PUFs, key extractors, or the like. Digital wallet 128 may store sensitive user information such as transfer method data, personal information, contact information, employment information, health insurance coverage data, and identification information. Digital wallet 128 may store transfer method data; transfer method data may include any type of electronic method of payment such as stored digital debit cards, credit cards, bank account routing numbers, cryptocurrency, cash, gift cards, prepaid cards, promotional cards, rewards cards, or any other type of account from which payment transactions may be consummated. Digital wallet 128 may store personal information, which may include user name and demographics. Digital wallet 128 may store contact information, which may include user home address, telephone number, user e-mail, and/or user social media accounts. Digital wallet 128 may store employment information, which may include name of user workplace, address of user workplace, telephone number of user workplace, and/or e-mail address of user workplace. Digital wallet 128 may store health insurance coverage data, which may include name and identification numbers of user health insurance, health savings cards, and/or health data. Digital wallet 128 may store identification information, which may include different forms of identification of user such as user Passport, user driver license, user social security card, user birth certificate, user work ID, and/or user school ID. In an embodiment, digital wallet 128 may be located on a plurality of receptacle devices 124. Digital wallet 128 may act to authenticate and evaluate information of user or first party seeking to perform an electronic transaction utilizing a digital wallet. Digital wallet 128 may authenticate transactions by performing biometric authentication of user. Digital wallet 128 may contain at least a certificate authority, that may issue public keys authenticating user and may act as personal local authenticator of user.

Still referring to FIG. 1, at least a receptacle device 124 may be configured to perform any method and/or method steps as disclosed herein, in any order and with any degree of repetition. As a non-limiting example, at least a receptacle device 124 may be configured to store a payment method associated with a user account, receive user authentication credentials from a user, authenticate user identity of the user as a function of the authentication credentials, and generate a payment authorization as a function of the payment method.

With continued reference to FIG. 1, system 100 may include one or more verified nodes 132. One or more verified nodes 132 may include one or more data storage nodes such as computing devices having a very high associated confidence level; one or more verified nodes 132 may, for instance, include a secure computing module 108, which may contain elements performing extremely reliable device identification and authentication methods. Secure computing module 108 of a verified node 132 may produce secure proofs that are authenticated or vouched for by manufacturers, rendering provenance and possession of the verified node 132 more transparent to users and devices in system 100. Secure computing module 108 may identify verified node 132 as belonging to an institution, person, or entity having a high degree of trustworthiness regarding system 100; high degree of trustworthiness may be established by identification of entity as one subject to regulation, such as a bank, or one having a significant stake in proper functioning of system 100, such as a large amount of virtual currency within system whose value and usability depend on overall system integrity. Still referring to FIG. 1, one or more verified nodes 132 may include a distributed storage instance. A distributed storage instance, as used herein, may include any locally stored portion or copy of a data structure used in distributed storage. Selection of verified node 132 may be performed by one or more verified nodes 132 according to any methods described below for establishment of confidence levels in a node. A verified node 132 may also contain a digital wallet 128. Verified node 132 may be recorded or otherwise identified in a verified node register. Verified node register may include any suitable listing of records identifying devices; verified node register may include a temporally sequential listing as described below. An instance of verified node register may include a sufficient link to or portion of a temporally sequential listing to permit a distributed verified node 132 including the instance to participate in one or more protocols for generating or recording digitally signed assertions, creating sub-listings, and/or authenticating digitally signed assertions, sublistings, and or temporally sequential listing as describe below. In an embodiment, weak points in storage protocols may be performed by highly trusted verified nodes.

With continued reference to FIG. 1, in the event additional security is required, e.g. the value to be stored is greater than warranted for storage according to a confidence level of a given evaluator or verified node 132, a cryptographic key required to access a store of value may be distributed across multiple verified nodes 132, such that a cost an adversary would have to expend is the sum of the costs of compromising all or a threshold number of intermediate evaluator nodes, for instance in the case of thresholded shards, holding pieces of the cryptographic key. Similarly, an element of data to be stored, including without limitation payment method, may be distributed among several receptacle devices 124 and recovered from such storage using above-described protocols, including without limitation sharding.

With continued reference to FIG. 1, system 100 includes a user device 136. User device 136 may be an authenticating device, and may be a user computer, a user laptop, a user smart-phone, a user tablet, a user mobile device, and/or a user kiosk. In an embodiment user device 136 may be solely owned and/or operated by user. User device 136 may be hardware containing (i.e. inherently containing) a secret used to create a secure proof that generates payment authorization, such as a hardcoded digital signature circuit, PUFs, key extractors, or the like. In an embodiment, user device 136 may contain at least a receptacle device 124 and digital wallet 128. In an embodiment, user device 136 may include a single device that performs an entire electronic transaction; in other words the user device 136 may include at least a receptacle device 124, digital wallet 128, and/or transfer processing device 104 in one device. In such an instance, user device 136, containing digital wallet 128, receptacle device 124 and transfer processing device may be a self-authenticating user device. In such an embodiment, all hardware needed to perform and process a transaction would be found on one single user device. In an embodiment user device 136 may not perform an entire electronic transaction; for example, when user provides authentication data through user device, which is then authenticated by transfer processing device 104 located on a server, which subsequently generates a payment authorization to user device, either acting as or communicating with at least a receptacle device 124.

Figure 2:
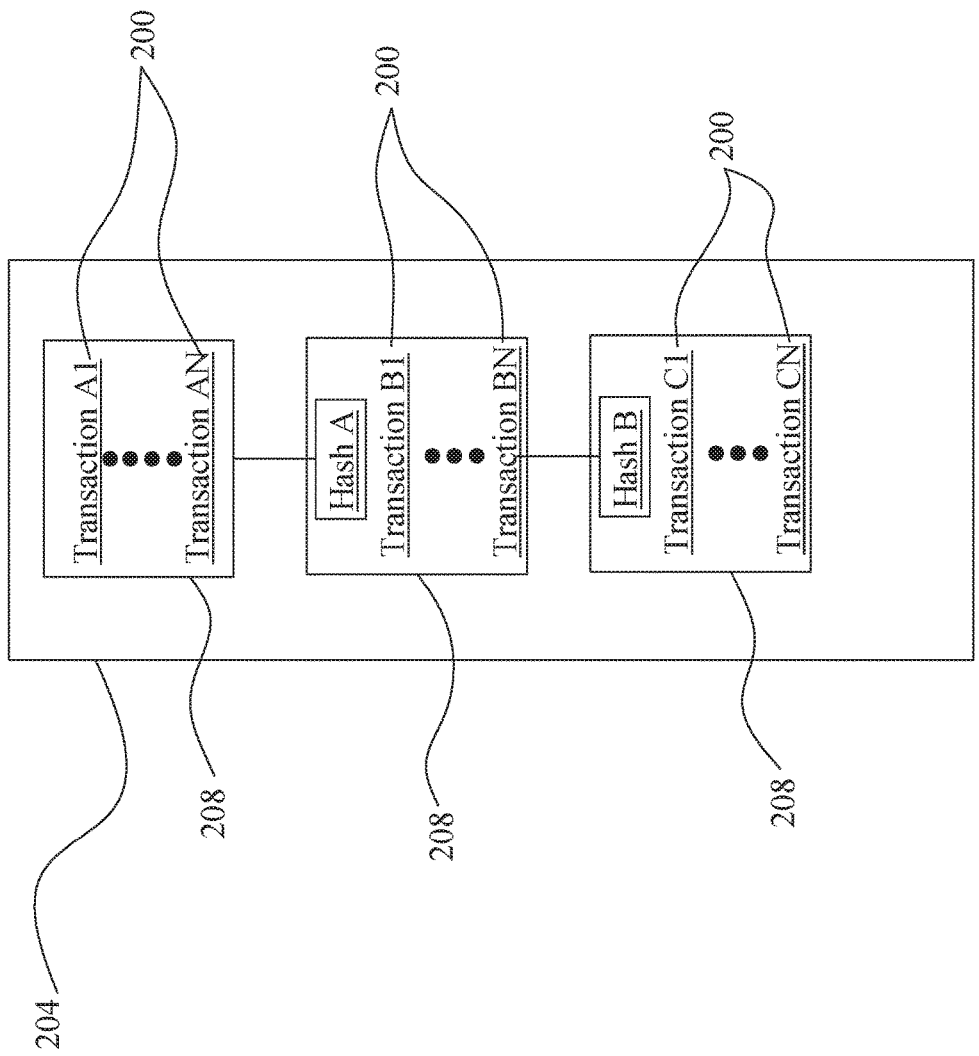
FIG. 2 is a block diagram of an exemplary embodiment of a temporally sequential listing.

Referring now to FIG. 2, system 100 and/or elements of system 100 may be used to perform one or more processing steps necessary to create, maintain, and/or authenticate a digitally signed assertion 200 and/or other element of data in a secure listing. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a verified storage node as described in further detail below.

With continued reference to FIG. 2, at least a digitally signed assertion 200 may be included in a secure listing. A "secure listing," as used in this disclosure, is a data structure including digitally signed assertions, credentials, and/or authentication tokens, where "including" an element of data signifies containing the element itself and/or a representation thereof such as a cryptographic hash, Merkle root, or the like, such that inclusion or "membership" in the secure listing can be proven. Membership in the secure listing may be revoked, in non-limiting example a secure listing may define the set of non-revoked members within a given temporal epoch. In non-limiting example, Membership may be proven by demonstrating that a member is not on a revocation list by means of secure proof or any method known to those skilled in the art. A secure listing may include a cryptographic accumulator. A "cryptographic accumulator," as used in this disclosure, is a data structure created by relating a commitment, which may be smaller amount of data that may be referred to as an "accumulator" and/or "root," to a set of elements, which may include without limitation textual elements, authentication tokens, digitally signed assertions, and/or credentials, together with membership and/or nonmembership proofs for any element in the set. In an embodiment, these proofs may be publicly verifiable against the commitment. A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. For instance, a cryptographic accumulator may be implemented as a Merkle tree and/or hash tree, in which each accumulated element created by cryptographically hashing a lot of data. Two or more accumulated elements may be hashed together in a further cryptographic hashing process to produce a node element; a plurality of node elements may be hashed together to form parent nodes, and ultimately a set of nodes may be combined and cryptographically hashed to form root. Contents of root may thus be determined by contents of nodes used to generate root, and consequently by contents of accumulated elements, which are determined by contents of lots used to generate accumulated elements. As a result of collision resistance and avalanche effects of hashing algorithms, any change in any lot, accumulated element, and/or node is virtually certain to cause a change in root; thus, it may be computationally infeasible to modify any element of Merkle and/or hash tree without the modification being detectable as generating a different root. In an embodiment, any accumulated element and/or all intervening between accumulated element and root 308 may be made available without revealing anything about a lot of data used to generate accumulated element.

Continuing to refer to FIG. 2, a secure listing may include a zero-knowledge set. A "zero-knowledge set," as defined in this disclosure, is a set of elements of textual data such as strings, to which a prover may commit such that after commitment the prover can prove, for any textual datum, whether the textual datum is or is not in the set without revealing any knowledge about the set and/or any element thereof beyond the verity of such membership assertions.

Continuing to refer to FIG. 2, a secure listing may include a range proof, defined for purposes of this disclosure as a set-membership proof with respect to a set that is a sequence of values on a range between upper and lower bounds, such as an open or closed set on the real number line or the like.

Still referring to FIG. 2, a secure listing may include a temporally sequential listing, which may include any set of data used to record a series of at least a digitally signed assertion in an inalterable format that permits authentication of such at least a digitally signed assertion. In some embodiments, secure listing records a series of at least a digitally signed assertion in a way that preserves the order in which the at least a digitally signed assertion took place. Secure listing may be accessible at any of various security settings; for instance, and without limitation, secure listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, secure listing may include a temporally sequential listing 204. Any step described herein for storage, writing to, retrieval from, generating records for, or otherwise utilizing, creating, and/or interacting with a temporally sequential listing may be performed with any other form of secure listing as described in this disclosure. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 6. For example, and without limitation, at least a digitally signed assertion 200 may include one or more encrypted or otherwise secured or partitioned memory entries as entered for instance using a secure computing module 108 or according to a secure computing protocol as described in further detail below.

Referring again to FIG. 1, in some embodiments, secure computing module 108 and/or verified node 132 may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 116, man in the middle or other attacks.

Still referring to FIG. 1, one or more data storage nodes 140 may include a distributed storage instance. A distributed storage instance, as used herein, may include any locally stored portion or copy of a data structure used in distributed storage. Distributed storage instance may include a copy of a temporally sequential listing 204, one or more sublistings 208, and/or a reference to a temporally sequential listing 204 or sublisting 208; distributed storage may include a sufficient link to or portion of temporally sequential listing 204 to permit a distributed storage node including to participate in one or more protocols for generating or recording digitally signed assertions 200, creating sub-listings 208, and/or authenticating digitally signed assertions 200, sublistings 208, and or temporally sequential listing 204 as describe above. Distributed storage instance 208 may include a local portion or link to any suitable distributed storage data structure, including without limitation a distributed hash table or the like.

Figure 3:
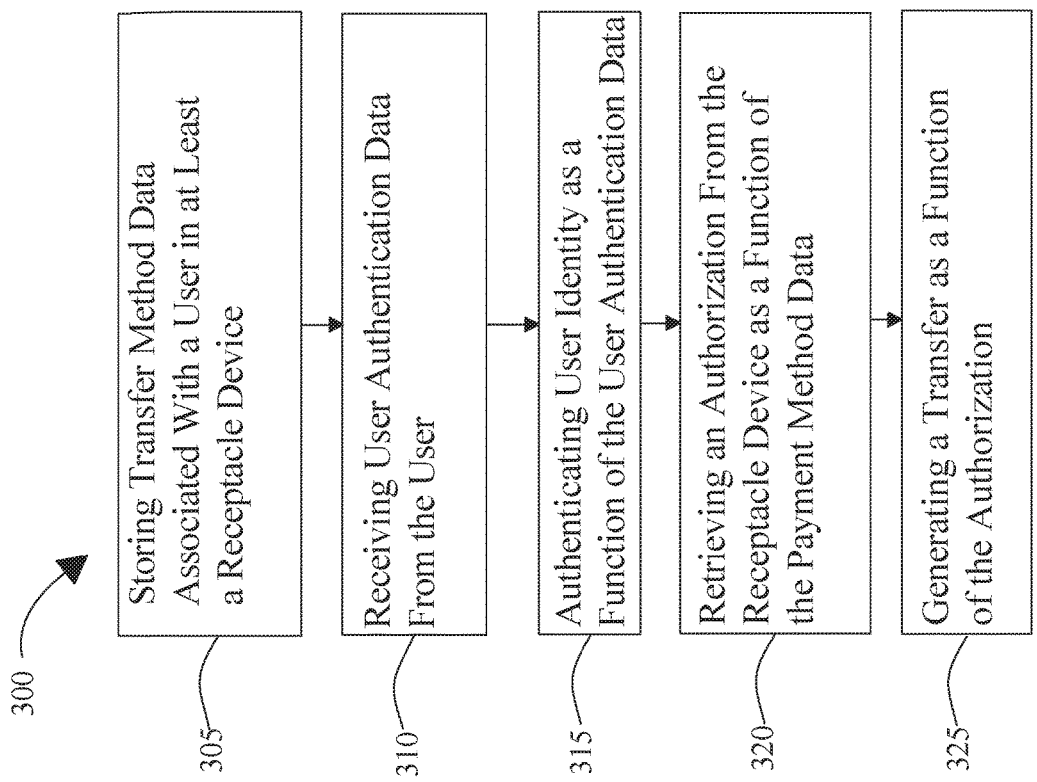
FIG. 3 illustrates particular implementations of various steps of a method for hardware-secured receptacle devices.

Referring now to FIG. 3, an exemplary embodiment of a method 300 for electronic transactions using digital wallets and trusted computing. At step 305 transfer processing device 104 stores transfer method data associated with a user in a digital wallet 128 stored on at least a receptacle device 124. Transfer method data may include any electronic method of payment as described in more detail above. Storing transfer method data may include encryption of transfer method data. Encryption may include encoding transfer method data in such a way that only authorized parties and/or devices can access it, and those who are not authorized cannot. In an embodiment, storing transfer method data may involve using a private key of a public key cryptographic system linked to transfer processing device 104; or example, transfer processing device 104 may encrypt payment method with a hardware-provided public encryption key generated by hardware of transfer processing device 104, including any element or elements described above for secure computing modules 108, then transfer it to at least a receptacle device 124 which lacks the ability to decrypt the transfer method data. In an embodiment, the transfer method data may be encrypted using a key linked to verified nodes 132. Linking may be performed using a key that is shared by multiple verified nodes 132. This may allow a device separate from the device encrypting the transfer method data to be able to decrypt it, so long as it is a verified device that has access to the shared key. For example, transfer processing device 104 may encrypt transfer method data using its hardware-provided public encryption key, or private key of a private system, and/or a private key stored in memory of transfer processing device 104. Transfer processing device 104 may then share encrypted transfer method data with at least a receptacle device 124; another verified node 132 and/or other device sharing a decryption key may decrypt the data.

With continued reference to FIG. 3, storing transfer method data associated with user in at least a receptacle device 124 may include assigning a confidence level to the at least a receptacle device 124. Assigning the confidence level to the at least a receptacle device 124 receptacle device 124 may include determining an identity of the at least a receptacle device 124 and calculating the confidence level as a function of the identity. In an embodiment, transfer processing device 104 and/or another device of system 100 may determine a confidence level in an identity of the at least a receptacle device 124; calculating the at least a confidence level may include calculating the at least a confidence level as a function of the at least a confidence level in the identity. Confidence level in identity may be computed, for instance, using one or more statistical measures of reliability of the identification method used; for instance, a user may enter an instruction on a processor providing statistics indicating success rates of various identification methods. Statistics may be collected based, as a non-limiting example, on discoveries of vulnerabilities in particular identification protocols and/or particular instances of secure computation module. A user of system may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. A device included in system 100 may also determine confidence level in identity as a function of, for instance, one or more algorithms collecting statistics concerning degree of accuracy in past iterations of a particular process for identifying at least a distributed storage node.

In an embodiment, and still viewing FIG. 3, determining identity of at least a receptacle device 124 may include determining identity of a first distributed storage node using a first identification protocol and determining identity of a second distributed storage node using a second identification protocol, wherein the first identification protocol is distinct from the second identification protocol. As a non-limiting example, a first distributed storage node of at least a first distributed storage node may be identified using a TTP protocol, while a second may be identified using a DAA protocol. As a further example, a first distributed storage node may be identified using a first version of a secure computing module 108 incorporated in the first distributed storage node, while a second distributed storage node may be identified using a second version of a secure computing module 108; the first version may, for instance, be a GhostRider implementation while the second is an SGX implementation, or the like. In an embodiment, identification of distributed storage nodes using heterogenous methods decreases the likelihood of an exploit successfully compromising all evaluators, as such an exploit would be required to take advantage of a potentially wide range of different vulnerabilities.

With continued reference to FIG. 3, at least a confidence level may include a single confidence level assigned to a single data storage node, a plurality of confidence levels assigned to a plurality of distributed data storage nodes, an aggregate confidence level of a plurality of distributed data storage nodes, or any other single or plural confidence level as described herein. Assigning a confidence level may include evaluating at least a digitally signed assertion signed by a data storage node of the at least a receptacle device 124 and assigning a confidence level to the data storage node as a function of the evaluation of the at least a digitally signed assertion. At least a digitally signed assertion may be identified as signed by at least a receptacle device 124 using any identification process or protocol as described above. In an embodiment, at least a digitally signed assertion may be incorporated in a temporally sequential listing of digitally signed assertions. For instance, where temporally sequential listing is a blockchain or similar data structure, each assertion may be included in the blockchain. At least a second digitally signed assertion may include a plurality of digitally signed assertions. For instance, at least a first distributed storage node may record a series of digitally signed assertions in temporally sequential listing; each transaction of the series of transactions may be authenticated by any process suitable for authenticating temporally sequential listing, including any process described herein for authentication of temporally sequential listing. As a further non-limiting example, at least a receptacle device 124 may enter an initial digitally signed assertion attesting to one or more elements of identification and/or authentication, including without limitation attestation of manufacturing date of at least a receptacle device 124 and/or secure computing module 108, identities, serial numbers, versions, or make of hardware components of at least a receptacle device 124 and/or secure computing module 108, or the like. Transactions performed by at least a data storage node may be scored according to authenticity; for instance, trusted status may be conferred on at least a data storage node only if a certain number of authenticated transactions have been performed by at least a data storage node, a certain amount of value has been conveyed in authenticated transactions by at least a node, a certain proportion (which may be 100%) of transactions performed by at least a data storage node have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by at least a data storage node, for instance.

Still referring to FIG. 3, calculating the at least a confidence level may include receiving a consensus evaluation of the at least a confidence level from a network of devices in system 100. For instance, all devices currently connected to network may determine a confidence level concerning a particular data storage node. This determination may be performed, for instance, by authenticating one or more current or past instances of a temporally sequential listing 204 and/or one or more sub-listings 208 thereof. Determination may include identification of one or more rejected instances of temporally sequential listing 204. Each device of a plurality of devices may provide a confidence level for the data storage node to be evaluated. A device connected to network, including without limitation transfer processing device 104, may calculate an aggregate confidence level based on confidence levels submitted by plurality of distributed data storage nodes; aggregation may be performed according to any method for aggregation of confidence levels described above. In an embodiment, aggregation may be weighted according to a previously determined confidence level of each data storage node of plurality of distributed data storage nodes performing consensus determination of confidence level of data storage node to be evaluated. This may include, e.g., ignoring confidence level submissions from evaluators having confidence levels below a certain threshold; alternatively or additionally, a processor may request confidence level determinations by a plurality of evaluators previously determined to have a confidence level above a certain threshold level. Each data storage node and/or other processor participating in consensus determination of confidence level may perform any action described herein for determining a confidence level, or any combination of such actions.

With continued reference to FIG. 3, assigning the at least a confidence level may include evaluating a digitally signed assertion assigning a recorded confidence level to a receptacle device of at least a receptacle device 124, and assigning the confidence level as a function of the recorded confidence level. Digitally signed assertion may be any digitally signed assertion as described herein. Digitally signed assertion may be included in any temporally sequential listing as described herein; temporally sequential listing may include a temporally sequential listing relating identifiers of receptacle devices 124 and/or other devices incorporated in system 100 to confidence levels, where identifiers may be any data usable as identifiers as described herein. Assignment of confidence level may be performed as a function of identifier; that is, identifier may be linked to an identity of a receptacle device 124, which may be used for assignment of confidence level as described in this disclosure. A device making a determination, including without limitation transfer processing device 104, may receive an instance of temporally sequential listing; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, and/or a network of devices having a confidence level in excess of a threshold, may have previously evaluated a confidence level in a certain receptacle device 124 and/or other device; in an embodiment, such a confidence level may itself be recorded in an assertion listed in temporally sequential listing 204. A plurality of such assertions, corresponding to a plurality of devices, including assertions corresponding to receptacle devices 124, may be listed; as such, a processor may determine confidence level in one or more receptacle devices solely by retrieving confidence levels so recorded. Alternatively or additionally, a processor may combine such confidence levels with confidence level determinations made by other means. Combination may be performed, e.g., by retrieving such confidence levels from temporally sequential listing 204 for at least a receptacle device 124 and calculating a confidence level for at least a second receptacle device by any other process described above. As a further example, a processor may retrieve a confidence level recorded in temporally sequential listing 204 for a given device, determine a confidence level for the same device, and then aggregate the two confidence levels according to any process as described above for aggregation of confidence levels.

Still referring to FIG. 3, confidence level may be weighted or modified according to one or more additional factors. For instance, confidence level may be weighted according to how recently at least a receptacle device 124 and/or other device signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level. As another example, a device that has recently "sold off" a large amount of value and/or has an assertion in a sub-listing 208 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 3, assigning the at least a confidence level may include performing a trusted time evaluation of at least an action performed by the at least a receptacle device 124 and/or other device in system 100. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via decentralized anonymous attestation (DAA)) to verify that a secure computing module 108 is an authentic secure computing module 108 that has the property of attested time. Generating the secure timestamp may be used to weed out spoofers or "man in the middle attacks."

Still referring to FIG. 3, secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 108. Additional data may include one or more additional data, including sensor data or a hash of data, that are received or generated by a processor. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other distributed storage nodes may evaluate confidence levels in at least a receptacle device 124 or other party generating secure timestamp and/or perform threshold cryptography with a plurality of such parties, each of which may have performed an embodiment of method to produce a secure timestamp. In an embodiment, data storage nodes or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 3, at least a confidence level assigned to a single data storage node may be compared to a threshold level. A threshold level may comprise a minimum acceptable confidence level of at least a data storage node. A threshold level may indicate trustworthiness of at least a data storage node. In an embodiment, a confidence level of at least a data storage node failing to meet threshold levels may be considered untrustworthy and as such may not be utilized. At least a data storage node that meets and/or exceeds threshold levels may be considered trustworthy and as such may be utilized. Weak points in storage protocols may be performed by highly trusted nodes, such as verified nodes 132, greatly exceeding threshold levels. A device failing to meet threshold levels may be flagged or marked as suspicious.

With continued reference to FIG. 3, storing transfer method data associated with user in digital wallet 128 may include selecting a verification datum inherent to at least a receptacle device 124 and associating the verification datum with user. At least a verification datum may include at least a public key of a public key cryptographic system; at least a public key may, for instance, include a public key associated with an "address" of a transfer method data associated with a user such as a cryptocurrency as described above in reference to FIG. 2, or a credit and/or debit card. At least a verification datum may be generated by hardware of at least a receptacle device 124. For example, at least a receptacle device 124 may generate at least a verification datum using secure computing module 108. In an embodiment, verification datum comprising a private key of a public key cryptographic system may be used to generate a digital signature inherent at least a receptacle device 124. At least a receptacle device 124 may generate a digital signature only when presented with public key that corresponds to private key stored on at least a receptacle device 124. In an embodiment, at least a receptacle device 124 may store multiple private keys corresponding to different users.

With continued reference to FIG. 3, verification datum may be generated by a PUF 116 of at least a receptacle device 124. For instance, a PUF 116 of at least a receptacle device 124 may generate a verification datum consisting of a private and public key pair using a random number. For instance, such a number output may be used as a seed in an elliptic curve cryptographic system. In a non-limiting example, output may include a random number generated within a desired interval, which may be achieved, for instance, by setting the number of output bits to be provided from PUF 116; steps along a chosen elliptic curve may then be performed using random number to generate a public key. Initial point on elliptic curve and elliptic curve may be selected using additional random numbers, which may be generated using any suitable method; random numbers associated with curves having known vulnerabilities may be discarded, according to mathematical descriptors or other characteristics of such vulnerabilities as stored in memory of or accessible to at least a first distributed storage node and/or secure computing module 108.

Still viewing FIG. 3, verification datum may be generated by a PUF 116 of at least a receptacle device 124 utilizing a numerical output from the PUF 116 or other element of secure computing module 108 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 116 and/or elements of secure computing module 108 may generate one or more random numbers, for instance by using one or more PUB as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUB or other elements. Keys may be used to generate exponents for a cryptographic system such as Diffie-Helman or ElGamal that are based on the discrete logarithm.

Continuing to refer to FIG. 3, at step 310 transfer processing device receives user authentication credentials from a user. User authentication credentials may be an authentication datum supplied by user that aids in identifying user. An authentication datum may be a knowledge factor such as a password that only user knows and is able to enter when prompted. Other knowledge factors may include a passphrase and/or personal identification number (PIN). Authentication datum may also be a possession factor, whereby authentication is demonstrated when user proves possession, such as possession of a security token and/or any authorization token as described in U.S. Nonprovisional application Ser. No. 16/680,787. Authentication datum may also be demonstrated by inherent factors including biometric methods which will be described in more detail later on. In yet another embodiment, authentication datum may include multiple authentication datums such as multi-factor authentication and two-factor authentication. In such an embodiment, two or more authentication datums may be supplied in order to identify user. For example, user identity may be authenticated by providing a password and correctly answering a secret question. In yet another non-limiting example, user identity may be authenticated by possession of a security token and a biometric iris scan.

Referring still to FIG. 3, at step 315 transfer processing device 104 authenticates user identity as a function of user authentication credentials. Authenticating user identity may further comprise biometric authentication. Biometrics are distinctive, measurable characteristics used to identify individuals. Biometric authentication involves authentication by a unique biological pattern derived from a measurable biological characteristic of a biological sample of user. Biometric authentication may involve both physiological biometrics and behavioral biometrics. These may include authenticating a user by scanning or analyzing user face, palm, vein, fingerprint, iris, retina, hand geometry, finger geometry, tooth shape, ear shape, olfactory characteristics, deoxyribonucleic acid (DNA), speech, voice, signature, keystroke, and/or gait. Biometric authentication may include sensors that capture and store biometric patterns of a user and then authenticate the pattern by performing a one-to-one comparison with templates stored in a biometric database. In an embodiment, multimodal biometric systems that include multiple sensors and/or multiple biometrics may be utilized. Multimodal biometric systems may obtain multiple scans from the same biological sample and/or multiple scans from different biological samples of the same user. For example, multiple scans from the same biological sample of user may include several iris scans, whereas, multiple scans from different biological samples of the same user may include authenticating user by an iris scan and a fingerprint scan.

With continued reference to FIG. 3, authenticating user identity further comprises user authentication credentials. Authentication credentials may include a user ID and corresponding password, PIN, and/or passphrase only known to user. User may then be authenticated as a function of user authentication credentials. In an embodiment, user authentication credentials may be compared to a stored database of user data and/or user authentication credentials, which may be able to authenticate user by comparing user authentication credentials to stored authentication credentials. Authenticating user as a function of authentication credentials further comprises receiving user authentication credentials from a user device. In an embodiment, user device 136 may contain stored user authentication credentials. Stored authentication credentials may be shared to authenticate user. Authenticating user further comprises authenticating user device 136. Authenticating user device may include identifying user device 136, using secure hardware of user device to authenticate user device 136. For example, authenticating user device 136 may include identifying user device 136 by a unique identifier such as a name or number specific to each user device 136. User device 136 may then be authenticated using secure hardware such as generating a secure proof including for example a digital signature and/or zero-knowledge proof.

With continued reference to FIG. 3, authentication of user may be performed by digital wallet 128. Digital wallet 128 may authenticate user using biometric identification. Biometrics are distinctive, measurable characteristics used to identify individuals as described previously above. In an embodiment, user may present at least a biological sample to be processed for authentication and identification when prompted by digital wallet 128. Upon authentication, transaction may continue forward. Authentication may be performed by at least a local certificate authority located directly on digital wallet 128. Certificate authority located on digital wallet 128 may issue a public key in a public key cryptographic system. Public key may be generated after authentication of private key presented by user. Certificate authority may produce a digital signature authenticating user possession of private key. In an embodiment, digital wallet may include a group of certificate authorities that may act to authenticate with a requirement that a threshold number of the group of certificate authorities, and/or a threshold proportion of the group of certificate authorities authenticate in coordination. As a further protection against corruption of certificate authorities and malicious actors, in an embodiment confidence levels may be calculated in a certificate authority located on a digital wallet. Highly trusted certificate authorities may be implemented, whereas certificate authorities that have a confidence level below a given threshold number may be eliminated. Certificate authority located on digital wallet 128 may allow for self-authentication of user by digital wallet. In an embodiment, transfer processing device 104 and receptacle device 124 containing digital wallet 128 may be located on user device 136. In such an instance, digital wallet may be self-authenticating and system 100 may be performed by one device in user possession. In an embodiment, certificate authority located on digital wallet 128 may generate authorization tokens granting user access to transfer method data. In an embodiment, authorization token may be associated with a temporal attribute. In an embodiment, authorization token generated by certificate authority located on digital wallet 128 may generate an authorization token with a specific time limit so that access to transfer method data is not unlimited to allow access by any person in possession of digital wallet 128 after a user has been authenticated. For example, authorization token may include a timestamp for the length of time to process a transaction at transfer processing device. In a non-limiting embodiment, authorization tokens may include any authorization token as described in U.S. Nonprovisional application Ser. No. 16/680,787.

With continued reference to FIG. 3, at step 320 transfer processing device 104 retrieves a payment authorization from a digital wallet as a function of transfer method data. Retrieving may include providing, to at least a verified node 132 of plurality of verified nodes, a payment authorization as a function of the transfer method data. For example, where payment authorization is recorded in a distributed data structure and/or temporally sequential listing, instances thereof may be distributed to multiple data storage nodes; alternatively, one or more maps or data structures may indicate at which devices a particular confidential datum is stored, permitting selection of a device for retrieval, according to, for instance, minimal network latency or geographical distance. Where at least a payment authorization includes a secure proof as described below, retrieving may include providing, to at least verified node 132, secure proof. A user may provide a secure proof to compare to the secure proof generated from a payment authorization. A user may provide without limitation, logon credentials such as password, username, or other identifier. Evaluation of payment authorization may be performed by one or more verified data storage node 132. For example, one or more verified nodes 132 may perform all user specific authentication and submit to verified data storage nodes 132 at least a payment authorization identifying one or more verified nodes 132, thereby assisting in protecting user privacy. In an embodiment, retrieving may involve decrypting a user's private key, and using the private key to generate a secure proof such as a digital signature. The key used to generate a secure proof may then be linked to transfer processing device 104 for authenticity.

With continued reference to FIG. 3, payment authorization may include a secure proof generated as a function of the transfer method data. The secure proof generated as a function of the transfer method data may be done using a multitude of transfer method data, such as a credit or debit card, or a PUF generated by the at least a receptacle device 124. A secure proof, as used herein, is a protocol whereby an output is generated that demonstrates possession of a secret, such as a secret stored in or produced by secure computing module 108 and/or PUF 116, without demonstrating the entirety of the secret; in other words, a secure proof by itself, is insufficient to reconstruct the entire secret, enabling the production of at least another secure proof using at least a secret. Where at least the at least a receptacle device 124 stores a plurality of secrets, such as a plurality of transfer method data, a secure proof may include an output that reveals the entirety of one of the plurality of secrets, but not all of the plurality of secrets; for instance, secure proof may be a response contained in one transfer method data. In an embodiment, proof may not be secure; in other words, proof may include a one-time revelation of at least a secret, for instance as used in a single electronic transaction.

With continued reference to FIG. 3, secure proof may include a digital signature. In an embodiment, digital signature may be any digital signature as described above; digital signature may be created by signing a mathematical representation of first dataset. In an embodiment, digital wallet 128, at least a receptacle device 124, and/or verified node 132 may generate a key to be used in producing a digital signature using secure computing module 108. A single key may be used in one or more digital signatures, such as signatures used to receive and/or transfer possession of crypto-currency assets, and/or transfer funds between accounts online using credit and/or debit cards; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a receptacle device 124 and/or secure computing module 108 may convert immediate output from PUF 116 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a receptacle device 124 and/or secure computing module 108 may extract one or more random numbers based on PUF 116 output to create a symmetric key as described above. Alternatively or additionally, extraction may include extraction of a private key of a public key cryptographic system.

Continuing to view FIG. 3, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 108 may act as a "first signer" of a digital signature, signing with a private key produced from a secret generator as described above. In an embodiment secure computing module 108 signs an element of data using the private key. A second signer, which may be secure computing module 108 and/or an additional element coupled thereto, may previously or subsequently sign the element of data or another element linked to the element previously signed; alternatively or additionally, second signer may use information or signature elements provided by secure computing module 108 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

In an embodiment, and with continued reference to FIG. 3, secure proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 3, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 3, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 3, secure proof may include be generated using a physically unclonable function. For instance, and without limitation, an output of a PUF 116 may be used to generate a private key for a digital signature as described above. Alternatively, or additionally, a PUF 116 output may constitute a secret to be used as a basis for a zero-knowledge proof, which may be any zero-knowledge proof as described herein. PUF 116 used to generate the secure proof may be generated by the at least a receptacle device 124. In an embodiment, the secure proof may be generated from transfer method data stored in hardware of at least a receptacle device 124.

With continued reference to FIG. 3, retrieving payment authorization from digital wallet 128 may include verifying digital wallet 128. Verifying digital wallet 128 may include receiving a verification datum corresponding to secure proof and evaluating the secure proof as a function of the verification datum. Verification datum, as used herein, is any datum that may be used to aid in evaluation of secure proof;

for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

With continued reference to FIG. 3, payment authorization may include generating a secure proof by digital wallet 128 and/or at least a receptacle device 124. In an embodiment, the secure proof may be generated by any of the methods previously discussed. This may include implementing the secure proof according to a direct anonymous attestation protocol. Secure proof may also be generating using a PUF. Secure proof may include a digital signature and/or zero-knowledge proof. In an embodiment, secure proof generated by digital wallet 128 may include a final authentication of user before payment is generated. In an embodiment, secure proof generated by digital wallet 128 may be evaluated and compared to verify secure proof generated by at least a receptacle device 124 and/or verified node 132. Verifying secure proof may include generating a verification datum, as used herein, is any datum that may be used to aid in evaluation of secure proof. For instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

Continuing to refer to FIG. 3, at step 325 transfer processing device generates a payment as a function of the payment authorization. Generating a payment may include transmitting payment authorization to one or more other devices, posting payment authorization to a temporally sequential listing in the form of at least a digitally signed assertion as described above, or the like. Generating a payment may include transmitting transaction details. Transaction details may include sending payment authorization to a second party and/or transmitting a payment request to user bank to verify sufficient funds of user and authorizing transfer of such funds to merchant bank.

Figure 4:
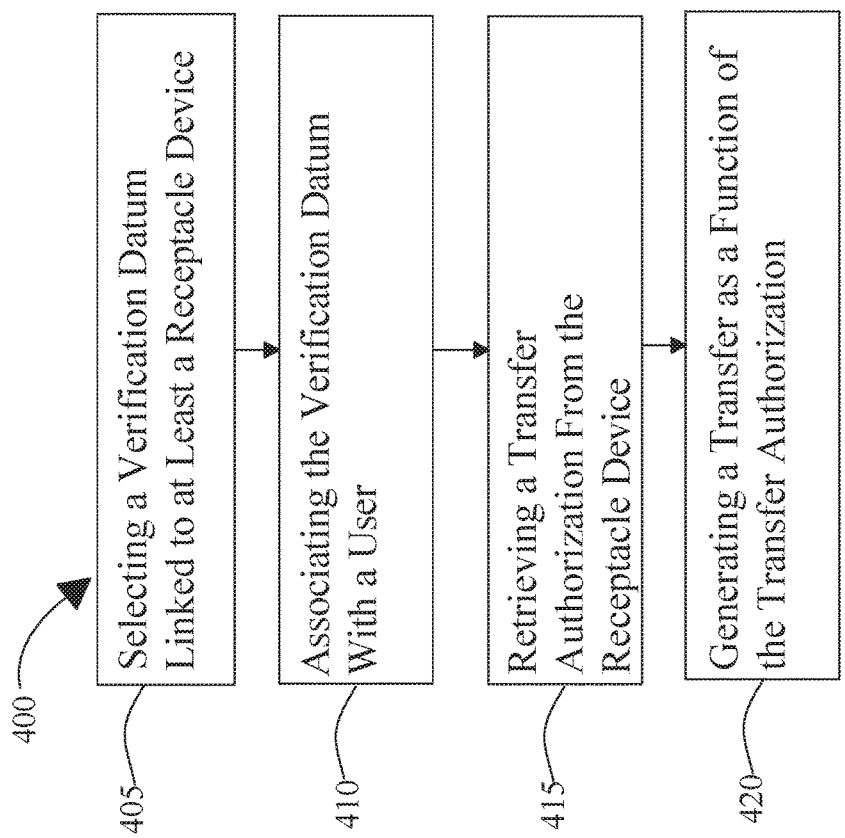
FIG. 4 illustrates particular implementations of various steps of a method for storing data associated with user in a receptacle device.

Referring now to FIG. 4, an exemplary embodiment of a method 400 for storing transfer method data associated with user in a digital wallet is illustrated. At step 405, a verification datum linked to at least a receptacle device 124 is selected by the at least a transfer processing device 104. Linking verification datum to at least a receptacle device 124 may be performed according to any method described above in reference to FIGS. 1-3, including generation of verification datum, by hardware of at least a receptacle device 124 that is configured to generate corresponding secure proof, secret data, or the like; this may be implemented using hardcoded digital signature generating circuits, PUFS, or the like. Linking may include generating a public and/or private key of a cryptographic system. In an embodiment, transfer processing device 104 may link user account information to a public encryption key corresponding to a private key. At least a receptacle device 124 may generate and utilize the public encryption key and corresponding private key received from transfer processing device 104 to generate a digital signature, thereby linking transfer processing device 104 and at least a receptacle device 124. Linking may further comprise utilizing secure hardware which may include utilizing secure computing module 108, TPM 112, and/or utilizing secure processor 120 to generate PUFs 116. Linking to a secure proof generated by hardware of at least a receptacle device may be performed according to any process or process steps as described above in reference to FIG. 3.

With continued reference to FIG. 4, at step 410 verification datum is associated with a user. Associating verification datum with a user may include authenticating user credentials. Authentication of user credentials may be performed using any methods or method steps previously discussed above in reference to FIGS. 1-3, including receiving user authentication credentials and authenticating a user as a function of the user authentication credentials. User authentication credentials may also be authenticated by receiving user authentication credentials from user device and authenticating user device; this may be implemented using any methods or method steps previously discussed above in reference to FIGS. 1-3.

Continuing to refer to FIG. 4, at step 415 at least a receptacle device 124 retrieves a payment method authorization. Payment method authorization may include any element suitable for use as a payment method authorization as described above in reference to FIGS. 1-3. For instance, and without limitation, payment method authorization may include a secure proof as previously discussed, including both digital signatures and zero-knowledge proof. In an embodiment, secure proof may be implemented according to a direct anonymous attestation protocol. Secure proof may be generated using PUFs. In an embodiment, at least a receptacle device 124 may be user device 136.

With continued reference to FIG. 4, at step 420 at least a receptacle device generates a payment; this may be implemented using any method or method steps as described above in reference to FIGS. 1-3.

Figure 5:
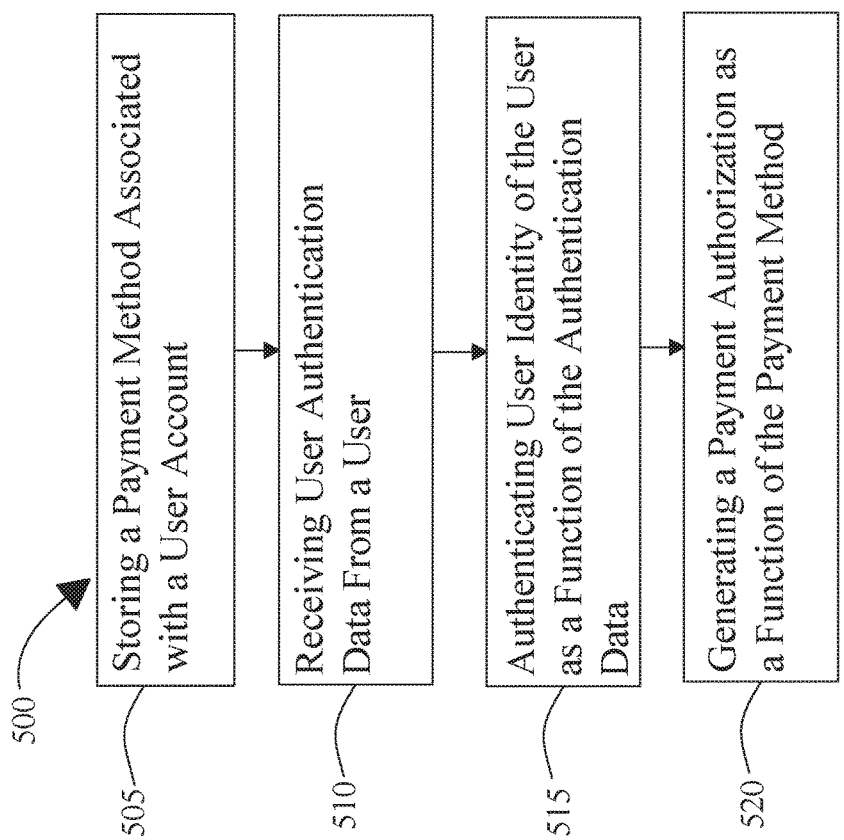
FIG. 5 illustrates particular implementations of various steps of a method for generating an authorization.

Referring now to FIG. 5, an exemplary embodiment of a method 500 for generating a payment method authorization. At step 505 a payment method associated with a user account is stored by a receptacle device 124. Storing may involve receiving an input linking and/or associating user account data to or with a hardware-based secret and linking user account information to the hardware-based secret. Linking may be implemented using any method or method steps as described above in FIG. 1-4. At step 510 user authentication credentials are received from a user at or by receptacle device 124. Receiving user authentication credentials from a user may be implemented using any method or method steps as described above in FIGS. 1-4. At step 515 user identity of the user is authenticated as a function of the authentication data, by receptacle device 124. Authentication data may be an authentication datum supplied by user that aids in identifying user, as described above. User authentication may be done any suitable way for user authentication as described above in FIGS. 1-4. At step 520 a payment authorization is generated as a function of the payment method. Generating a payment authorization may be implemented using secure hardware and/or secure proof by any method or method steps as described above in FIGS. 1-4. This may include generating a secure proof such as zero-knowledge proof and/or a digital signature by direct anonymous attestation protocols as described above in FIGS. 1-4.

Figure 6:
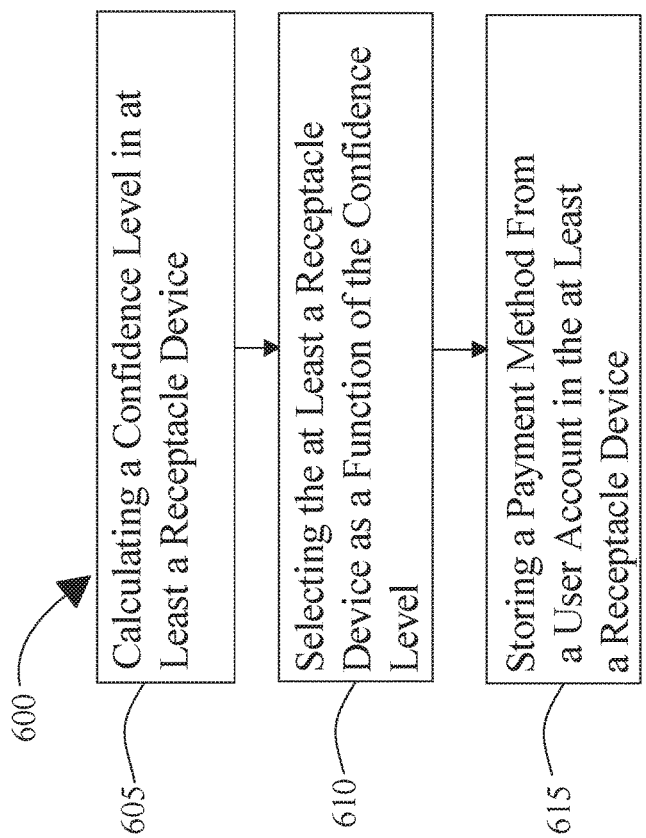
FIG. 6 illustrates particular implementations of various steps of a method for storing data in a receptacle device selected as a function of confidence level.

Referring now to FIG. 6, an exemplary embodiment of a method 600 for storing transfer method data in at least a receptacle device selected as a function of confidence level is illustrated. At step 605, a confidence level is calculated in the at least a receptacle device by a transfer processing device 104. Confidence level calculated in the at least a receptacle device may be done by any of the methods previously discussed in reference to calculating a confidence level in FIGS. 1-4. Calculating the confidence level may further comprise evaluating a secure timestamp as also previously discussed above. At step 610, at least a receptacle device 124 is selected by transfer processing device 104 as a function of the confidence level. Selecting may be implemented using any method or method steps as described above in FIGS. 1-4. At step 615 a payment method associated with a user account is stored in the at least a receptacle device by transfer processing device 104. Storing may be implemented using any method or method steps as described above in FIGS. 1-3.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
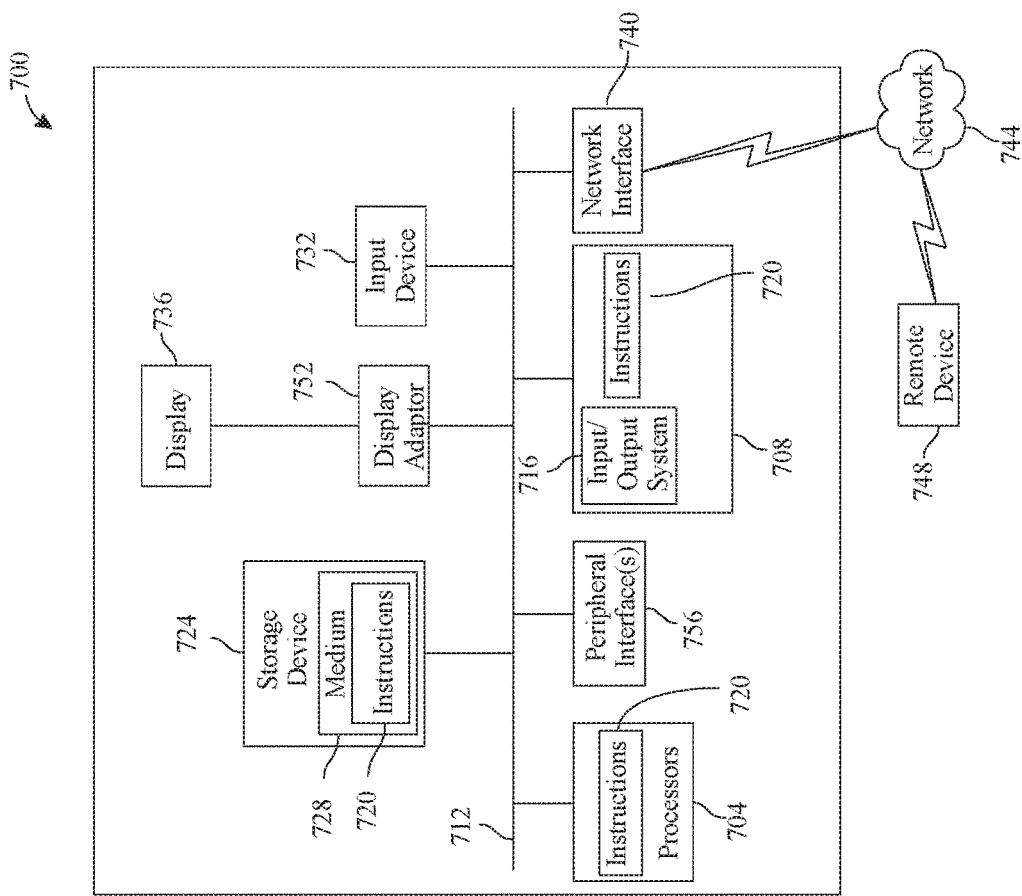
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 32. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE- WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of using hardware-secured receptacle devices, the method comprising:
storing, by a transfer processing device, transfer method data associated with a user on an at least a cryptographically secured receptacle device, wherein storing by the transfer processing device comprising:
assigning a receptacle confidence level to the at least a receptacle device, wherein assigning the receptacle confidence level comprises:
receiving, by the transfer processing device, one or more confidence levels from a plurality of data storage nodes;
calculating, by the transfer processing device, the receptacle confidence level as a function of the one or more confidence levels submitted by the plurality of distributed data storage nodes, wherein calculating the receptacle confidence level comprises:
evaluating a plurality of entries within a temporally sequential listing, wherein each entry of the plurality of entries is associated with the at least a receptacle device; and
determining the receptacle confidence level as a function of evaluating the plurality of entries;
selecting a verification datum inherent to the receptacle device, wherein the verification datum is generated by a physically unclonable function (PUF) of the receptacle device; and
associating the verification datum with the user; receiving, by the transfer processing device, user authentication credentials from the user;
authenticating, by the transfer processing device, a user identity as a function of the user authentication credentials;
retrieving, by the transfer processing device, a transfer authorization from the at least a cryptographically secured receptacle device as a function of the transfer method data; and
generating, by the transfer processing device, a transfer as a function of the transfer authorization.

2. The method of claim 1, wherein the at least a receptacle device further comprises the transfer processing device.

3. The method of claim 1, wherein storing further comprises encryption of the transfer method.

4. The method of claim 3, wherein encryption further comprises encryption using a public key linked to the transfer processing device.

5. The method of claim 3, wherein the transfer method data is encrypted using a key linked to at least a verified device.

6. The method of claim 1, wherein authenticating the user identity further comprises performing a biometric authentication of the user.

7. The method of claim 1, wherein the transfer authorization includes a secure timestamp.

8. The method of claim 1, wherein generating the transfer further comprises digitally signing, by the transfer processing device, the transfer authorization.

9. The method of claim 1, wherein generating the transfer further comprises transmitting transfer transaction details.

10. A system for using hardware-secured receptacle devices, the system comprising a transfer processing device, including a computing device and a secure computing module, the secure computing module comprising a trusted platform module, configured to:
- store transfer method data associated with a user on an at least a cryptographically secured receptacle device, wherein storing by the transfer processing device comprising:
  - assigning a receptacle confidence level to the at least a receptacle device, wherein assigning the receptacle confidence level further comprises:
    - receiving, by the transfer processing device, one or more confidence levels from a plurality of data storage nodes;
    - calculating, by the transfer processing device, the receptacle confidence level as a function of the one or more confidence levels submitted by the plurality of distributed data storage nodes, wherein calculating the receptacle confidence level comprises:
      - evaluating a plurality of entries within a temporally sequential listing, wherein each entry of the plurality of entries is associated with the at least a receptacle device; and
      - determining the receptacle confidence level as a function of evaluating the plurality of entries;
  - selecting a verification datum inherent to the receptacle device, wherein the verification datum is generated by a physically unclonable function (PUF) of the receptacle device; and
  - associating the verification datum with the user;
- receive user authentication credentials from the user;
- authenticate user identity as a function of the user authentication credentials;
- retrieve a transfer authorization from the at least a cryptographically secured receptacle device as a function of the transfer method data; and
- generate a transfer as a function of the transfer authorization.

11. The system of claim 10, wherein the at least a receptacle device further comprises the transfer processing device.

12. The system of claim 10, wherein the transfer processing device is further configured to store the transfer method data by encryption of the transfer method.

13. The system of claim 12, wherein encryption further comprises encryption using a public key linked to the transfer processing device.

14. The system of claim 12, wherein the transfer method data is encrypted using a key linked to at least a verified device.

15. The system of claim 10, wherein the transfer processing device is further configured to authenticate the user identity by performing a biometric authentication of the user.

16. The system of claim 10, wherein the transfer authorization includes a secure timestamp.

17. The system of claim 10, wherein the transfer processing device is further configured to generate the transfer by digitally signing, by the transfer processing device, the transfer authorization.

18. The system of claim 10, wherein the transfer processing device is further configured to generate the transfer by transmitting transfer transaction details.

* * * * *